(12) United States Patent
Tawara et al.

(10) Patent No.: US 7,254,554 B2
(45) Date of Patent: *Aug. 7, 2007

(54) ACCOUNTING SYSTEM AND METHOD FOR PROCESSING TRANSACTION DATA

(75) Inventors: Kazuo Tawara, Kanagawa (JP); Naoki Yoshida, Kanagawa (JP); Shiro Tamatani, Kanagawa (JP); Toru Hanya, Kanagawa (JP); Masatoshi Mizuno, Kanagawa (JP); Chiaki Tanaka, Kanagawa (JP); Naoki Nishimura, Kanagawa (JP); Yukiyoshi Nishiyama, Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,729

(22) Filed: Feb. 8, 2000

(65) Prior Publication Data
US 2003/0050876 A1 Mar. 13, 2003

(30) Foreign Application Priority Data
Nov. 17, 1999 (JP) ................... 11-326783

(51) Int. Cl.
*G07B 17/00* (2006.01)
(52) U.S. Cl. ............... 705/30; 705/11; 705/32; 705/34
(58) Field of Classification Search ............ 705/30
See application file for complete search history.

(56) References Cited
U.S. PATENT DOCUMENTS

| 4,642,767 | A | * | 2/1987 | Lerner | 364/406 |
|---|---|---|---|---|---|
| 5,189,608 | A | * | 2/1993 | Lyons et al. | 364/408 |
| 5,390,113 | A | * | 2/1995 | Sampson | 364/419.19 |
| 5,835,899 | A | * | 11/1998 | Rose et al. | 705/34 |
| 6,014,640 | A | * | 1/2000 | Bent | 705/30 |
| 6,058,375 | A | * | 5/2000 | Park | 705/30 |
| 6,058,392 | A | * | 5/2000 | Sampson et al. | 705/30 |
| 6,085,173 | A | * | 7/2000 | Suh | 705/30 |
| 6,128,602 | A | * | 10/2000 | Northington et al. | 705/35 |
| 7,003,470 | B1 | * | 2/2006 | Baker et al. | 705/1 |
| 2002/0016752 | A1 | * | 2/2002 | Suh | 705/30 |
| 2002/0138376 | A1 | * | 9/2002 | Hinkle | 705/30 |

FOREIGN PATENT DOCUMENTS

GB 2159644 A * 12/1985

OTHER PUBLICATIONS

Horngren, Foster, Datar; "Cost Accounting: A Managerial Emphasis", 1999.*
Hardy, John W., Hubbard, E. Dee; ABC: Revisiting the Basics; CMA Magazine; Nov. 1992.*

* cited by examiner

Primary Examiner—F. Zeender
Assistant Examiner—Christopher Buchanan
(74) Attorney, Agent, or Firm—Staas & Halsey LLP

(57) ABSTRACT

Transaction data representing a transaction to be processed is input through an input terminal. An interface unit assigns the input transaction data a business code identifying the business activities of a company involved in the transaction represented by the transaction data, and a type code identifying an account title classified based on a cost element. A journalizing unit refers to a master information storage unit, and journalizes the transaction data based on the business code and the type code. The journal result is stored in a database accessible from the terminal device of the accounting division.

1 Claim, 17 Drawing Sheets

| DIVISION | CONTENTS OF BUSINESS | BUSINESS CODE ||REMARKS|
| --- | --- | --- | --- | --- |
| | | DIVISION | BUSINESS | |
| ⌇ | | | | |
| PERSONNEL DIVISION | WAGES | 02 | 001 | |
| | DOMESTIC TRAVEL | 02 | 002 | |
| | OVERTIME PAY ADJUSTMENT | 02 | 003 | |
| | ⌇ | | | |
| ⌇ | | | | |

FIG. 5

| CODE | TYPE | |
|---|---|---|
| ⋮ | ∫ | |
| ⋮ 3153 3155 3156 ⋮ | ACCOUNTS PAYABLE | ∫ WAGES TRAVEL PERSONNEL ∫ |
| ⋮ | ∫ | |

FIG. 6

| DIVISION CODE | ACCOUNTING UNIT | DIVISION NAME | DATA SECTION | ACCOUNTING MANAGEMENT UNIT | INDIRECT COST SECTION | MODEL CODE |
|---|---|---|---|---|---|---|
| 001111 | 000 | GENERAL AFFAIRS DEPARTMENT IN HEAD OFFICE | ○ | ○○ | ○○ | ×× |
| 002222 | 000 | GENERAL AFFAIRS DEPARTMENT IN HEAD OFFICE | ○ | ○○ | ○○ | ×× |
| 001300 | 080 | KAWASAKI FACTORY) PURCHASE | ○ | ○○ | ○○ | ×× |
| 005555 | 501 | FUJITSU OA | ○ | ○○ | 9 | ×× |
| 000212 | 080 | KAWASAKI) ACCOUNTING SUB-DEPARTMENT | ○ | ○○ | A | ×× |
| ..... | ..... | ..... | ..... | ..... | ..... | ..... |

RETRIEVAL

F I G. 8

| ACCOUNT TITLE || EXPENSE ITEM | EXPENSE ITEM ||
|---|---|---|---|---|
| MAIN TITLE | INITIAL SYMBOL | | EXPENSE ITEM NAME | EXPENSE ITEM CODE |
| INDIRECT COST | EX | PERSONNEL EXPENSES | WAGES<br>INDIRECT PAY<br>BONUSES<br>⋮ | 0110<br>0120<br>0130<br>⋮ |
| | | ≀ |||
| ≀ |||||

F I G. 1 2

| | | | AUXILIARY LEDGER | | | | |
|---|---|---|---|---|---|---|---|
| EO | △ △ △ JOINT-STOCK COMPANY | | | | | | PAGE 5 |
| B000 | HEAD OFFICE | | (JULY 1, 1997 THROUGH JULY 31, 1997) | | | GENERATED ON JULY 31, 1997 | |
| | | | ACCOUNTS RECEIVABLE-TRADE | | | | |
| DATE OF SLIP | SLIP NUMBER | LINE | DIVISION INVOLVED | TITLE OF CORRESPONDENT | DEBIT | CREDIT | BALANCE |
| | | | ** TITLE CONTINUED ** | | 119,587,762 | 104,191,646 | 15,396,116 |
| 1997/07/03 | 00703001-001 | 1 | SALES OF STORAGE SYSTEM (KK YAMAKAWA) | | | | |
| | | | TOKYO SALES DEPARTMENT | SALES OF PRODUCT | 315,000 | | 15,711,116 |
| | | 3 | SALES OF WORK STATION (KK YAMAKAWA) | | | | |
| | | | TOKYO SALES DEPARTMENT | SALES OF PRODUCT | 1,260,000 | | 16,971,116 |
| 1997/07/09 | 00012345-003 | 2 | | | | | |
| | | | TOKYO GENERAL AFFAIRS DEPARTMENT | CASH | | 500,000 | 16,471,116 |
| | 00709002-001 | 1 | SALES OF CABINET (KK YAMAKAWA) | | | | |
| | | | TOKYO SALES DEPARTMENT | SALES OF PRODUCT | 1,575,000 | | 18,046,116 |
| 1997/07/11 | 00120000-002 | 1 | COLLECTING PRODUCT SALES AMOUNT | | | | |
| | | | TOKYO SALES DEPARTMENT | CURRENT DEPOSIT | | 3,645,000 | 14,401,116 |
| 1997/07/15 | 00012162-001 | 1 | SALES OF WORK STATION | | | | |
| | | | TOKYO SALES DEPARTMENT | SALES OF PRODUCT | 262,500 | | 14,663,616 |
| | | 3 | SALES OF WORK STATION | | | | |
| | | | TOKYO SALES DEPARTMENT | SALES OF PRODUCT | 262,500 | | 14,926,116 |
| | 00121603-001 | 1 | SALES OF WORK STATION | | | | |
| | | | TOKYO SALES DEPARTMENT | SALES OF PRODUCT | 78,750 | | 15,004,866 |
| | 00121608-001 | 1 | SALES OF WORK STATION | | | | |
| | | | TOKYO SALES DEPARTMENT | SALES OF PRODUCT | 105,000 | | 15,109,866 |
| | | 3 | SALES OF WORK STATION | | | | |
| | | | TOKYO SALES DEPARTMENT | SALES OF PRODUCT | 10,500 | | 15,120,366 |
| | 00123456-001 | 1 | SALES OF WORK STATION | | | | |
| | | | TOKYO SALES DEPARTMENT | SALES OF PRODUCT | 100,000 | | 15,220,366 |
| 1997/07/18 | 00001234-001 | 1 | SALES OF STORAGE SYSTEM | | | | |
| | | | TOKYO SALES DEPARTMENT | SALES OF PRODUCT | 5,000,000 | | 20,220,366 |
| | | 3 | | | | | |
| | | | TOKYO SALES DEPARTMENT | SALES OF PRODUCT | 200,000 | | 20,420,366 |
| | 00123456-001 | 1 | SALES OF STORAGE SYSTEM | | | | |
| | | | TOKYO SALES DEPARTMENT | SALES OF PRODUCT | 525,000 | | 20,945,366 |
| | 00220089-001 | 1 | | | | | |
| | | | TOKYO SALES DEPARTMENT | SALES OF PRODUCT | 126,000 | | 21,071,366 |
| | 00222006-001 | 1 | | | | | |
| | | | TOKYO SALES DEPARTMENT | SALES OF PRODUCT | 3,150,000 | | 24,221,366 |
| 1997/07/20 | 00222010-001 | 1 | | | | | |
| | | | TOKYO SALES DEPARTMENT | RECEIVABLE-TRADE | | 1,575,000 | 22,646,366 |
| 1997/07/22 | 00007001-001 | 1 | SALES OF STORAGE SYSTEM | | | | |
| | | | TOKYO SALES DEPARTMENT | SALES OF PRODUCT | 328,000 | | 22,974,366 |
| 1997/07/23 | 00072301-001 | 1 | | | | | |
| | | | TOKYO SALES DEPARTMENT | SALES OF PRODUCT | 31,500,000 | | 54,474,366 |
| 1997/07/24 | 00514020-001 | 1 | | | | | |
| | | | TOKYO SALES DEPARTMENT | CURRENT DEPOSIT | | 1,980,000 | 52,494,366 |
| | | | ** TITLE PERIOD ** | | 44,798,250 | 7,700,000 | |

FIG. 14

TRIAL BALANCE

E0 △ △ △ JOINT-STOCK COMPANY  
Z000 SYSTEM  
PAGE 1  
(JULY 1, 1997 THROUGH JULY 31, 1997)  GENERATED ON JULY 24, 1997  
UNIT: YEN

| TITLE NAME | CONTINUED | DEBIT | CREDIT | BALANCE |
|---|---|---|---|---|
| ASSETS | | | | |
| CURRENT ASSETS | | | | |
|   CASH | 1,134,251 | 23,274,334 | 23,358,787 | 1,049,798 |
|   CURRENT DEPOSITS | 1,265,975 | 13,500,000 | 16,264,248 | -1,498,273 |
|   ORDINARY CURRENT DEPOSITS | 133,233,730 | 270,839,522 | 297,623,034 | 106,450,218 |
|   TIME DEPOSITS | 405,000,000 | 350,000,000 | 35,000,000 | 405,000,000 |
|   RESERVE DEPOSITS | 13,200,000 | 1,300,000 | | 14,500,000 |
| CASH AND DEPOSITS | 553,833,956 | 658,913,856 | 687,246,069 | 525,501,743 |
|   NOTES RECEIVABLE-TRADE | 216,148,242 | 82,228,488 | 75,306,045 | 223,070,685 |
|   ACCOUNTS RECEIVABLE-TRADE | 70,427,843 | 52,333,442 | 49,602,608 | 73,158,677 |
|   SECURITIES | 0 | 0 | | 0 |
| TOTAL CURRENT ASSETS | 1,129,920,895 | 995,124,474 | 989,024,025 | 1,136,021,344 |
|   FINISHED GOODS | 29,973,688 | 66,420,603 | 67,158,438 | 29,235,853 |
|   INVENTORY | 4,451,458 | 16,192,343 | 13,989,635 | 6,654,166 |
| TOTAL INVENTORIES | 34,425,148 | 82,612,946 | 81,148,073 | 35,890,019 |
|   PREPAID EXPENSE | 4,179,600 | 0 | 1,399,618 | 2,779,982 |
|   ACCOUNTS RECEIVABLE | 2,467,486 | 1,337,401 | 1,933,335 | 1,871,552 |
|   PAYMENT FOR ANOTHER | 22,699,039 | 10,059,268 | 14,030,772 | 18,727,535 |
|   SUSPENSE PAYMENT | 1,755,126 | 4,236,520 | 4,003,379 | 1,988,267 |
|   CONSUMPTION TAX FOR SUSPENSE PAYMENT | 10,703,598 | 6,170,645 | 181 | 16,874,062 |
| TOTAL OTHER CURRENT | 41,804,849 | 21,803,834 | 21,367,285 | 42,241,398 |
| TOTAL CURRENT ASSETS | 1,206,150,890 | 1,099,541,254 | 1,091,539,383 | 1,214,152,781 |
| FIXED ASSETS | | | | |
|   BUILDINGS | 186,420,408 | 0 | | 186,420,408 |
|   ACCESSORIES TO BUILDINGS | 51,276,251 | 2,020,000 | | 53,296,251 |
|   STRUCTURES | 25,052,701 | 0 | | 25,052,701 |
|   MACHINERY AND EQUIPMENT | 27,732,076 | 0 | | 27,732,076 |
|   CARS AND OTHER LAND DELIVERY EQUIPMENT | 91,329,964 | 8,149,000 | 79,040 | 99,399,924 |
|   TOOLS, FURNITURE AND FIXTURES | 5,763,053 | 0 | 15,000 | 5,748,053 |
|   LAND | 139,533,112 | 0 | | 139,533,112 |
|   CONSTRUCTION SUSPENSE PAYMENT | 7,000,000 | 0 | | 7,000,000 |
| TOTAL TANGIBLE FIXED | 534,107,565 | 10,169,000 | 94,040 | 533,182,525 |
| TOTAL LESS-ACCUMULATED | 0 | 0 | | 0 |
|   TELEPHONE SUBSCRIPTION RIGHT | 1,565,202 | 0 | | 1,565,202 |
|   WATER SUPPLY USE RIGHT | 0 | 0 | | 0 |
| TOTAL INTANGIBLE FIXED | 1,565,202 | 0 | | 1,565,202 |
|   SECURITY INVESTMENTS | 63,715,759 | 355,216 | | 64,070,975 |
|   LONG-TERM PREPAID EXPENSES | 60,096 | 0 | | 60,096 |
| TOTAL INVESTMENTS AND OTHERS | 148,065,047 | 43,970 | | 146,109,017 |
| INVESTMENTS AND OTHER | 209,840,902 | 399,186 | | 210,240,088 |

FIG. 15

ACCOUNTING SYSTEM AND METHOD FOR PROCESSING TRANSACTION DATA

BACKGROUND OF THE INVENTION

1. Field of the Invention

The present invention relates to a system, a method, and software which provides the method for use in processing transaction data used to check the financial condition and the profit and loss of a company.

2. Description of the Related Art

Regardless of whether a company is a small private company or a large enterprise, the company operates while checking its financial condition and its profit and loss. The financial condition and the profit and loss can be not only important indexes when management strategies are set for the future, but also necessary information when the tax is computed and a report is issued to stockholders.

A company normally generates financial statements to report its financial condition and its profit and loss by classifying and adjusting transactions. The financial statements contains a balance sheet indicating the share of assets on the closing day, and a profit and loss statement indicating the profit and loss in an accounting period. A 'transaction' refers not only to 'sales' and 'purchase of material', but also all economic processes relating to business activities such as 'payment of wages' and 'adjustment of traveling expenses'. In addition, the process of classifying transactions to be processed according to predetermined rules is normally referred to as a journal entry.

The financial statements are often generated using a computer these days. In addition, the application software for generation of financial statements, etc. is also put on sale.

In an existing accounting system (application software or a device for the application software for generation of financial statements, etc.), the data relating to each transaction is normally input in each division (a sales department, a planning department, a purchase department, a personnel department, . . . , affiliated firms, etc.) forming part of a company, and is transmitted to an accounting division through a LAN (local area network) or Intranet, etc. Then, the accounting system generates (or supports to generate) financial statements by journalizing the data collected by the system.

However, the data collected by the accounting division has been conventionally input using the business management system individually developed for each division. That is, the business management system provided for each division has not been designed on the presumption that input data is to be reflected on the financial statements, etc. in the accounting division. In addition, since the terms and the classifying method used in the financial statements are normally not familiar to a person in a division other than the accounting division, each division often designs its own business management system. Therefore, the format of the data obtained from each division is often different from each other, and it has been difficult for the accounting division to centrally manage the information relating to the activities of the company.

Furthermore, if the format of the data obtained from each division is different from each other, then it is necessary for a program (correspondence table) used to generate financial statements, etc. from the transaction data obtained from each division to be prepared for the business management system of each division. Therefore, the complicated cooperation with the accounting system requires laborious maintenance and management. Especially, the accounting division has to check whether or not the data generated from transaction data is correct. In addition, if transaction data inconsistent with the format requested by the accounting division is input, then an error normally occurs in the accounting division. In this case, it is necessary for a person in charge in the accounting division checks each piece of the transaction data, and then has to manually input correct data. That is, there has been a heavy load in the accounting division.

In addition, when each division independently manages and controls its own operation, and when the expense of a transaction to be processed between divisions is to be transferred to another division, it is necessary that the accounting division first makes a journal entry as a head office account, and then generates transfer data on the responsibility of the accounting division. For example, when the traveling expenses of a member of the development division is borne by the sales division, the transaction data input by the development division is first journalized by the accounting division, and then it is reported to the sales division. Although another method is adopted, it is necessary to determine the method when the accounting division makes a journal entry, thereby causing a heavy load onto the accounting division.

SUMMARY OF THE INVENTION

The present invention has been developed to solve the above described problems, and aims at providing a system and a method for easily generating information relating to the financial condition and the profit and loss of a company from a transaction to be processed as the economic activities of the company.

The accounting system according to the present invention processes transaction data indicating a transaction of a company formed by a plurality of divisions, and includes an input unit for inputting transaction data for each division; an extraction unit for extracting a first identifier corresponding to a transaction represented by the transaction data input through the input unit from among the identifiers identifying the business activities of a company, and extracting a second identifier corresponding to a transaction represented by the transaction data from among the identifiers identifying an account title classified based on cost elements; and a classification unit for classifying the transaction based on the first and the second identifiers extracted by the extraction unit.

When financial statements are prepared, it is convenient if transactions are classified based on the types of business activities. In the financial statements, each transaction is classified in account titles. Therefore, in the financial statements, an identifier of the business activities of a company and an identifier of an account title classified based on cost elements are obtained for a transaction represented by the transaction data input for each division, and the transaction data is classified based on the identifiers. Thus, the load of preparing financial statements on the accounting division can be reduced.

In the above described system, a commonly used identifier can be adopted in the plurality of divisions as the first and the second identifiers. With the configuration, the accounting division can centrally manage the information about company activities. In addition, when expenses of a transaction to be processed between divisions are transferred to another division, the contents of the transaction data input, the financial statements necessarily reflect the contents of the transaction data input by the divisions.

BRIEF DESCRIPTION OF THE DRAWINGS

FIG. 5 shows a part of an example of a business code;

FIG. 6 shows a part of an example of a type code;

FIG. 8 shows the configuration of a division master;

FIG. 12 shows an example of an initial symbol and an expense item code;

FIG. 14 shows an example of an auxiliary ledger generated according to accounting information;

FIG. 15 shows an example of a profit and loss table generated based on the auxiliary ledger;

DESCRIPTION OF THE PREFERRED EMBODIMENTS

Figure 1:
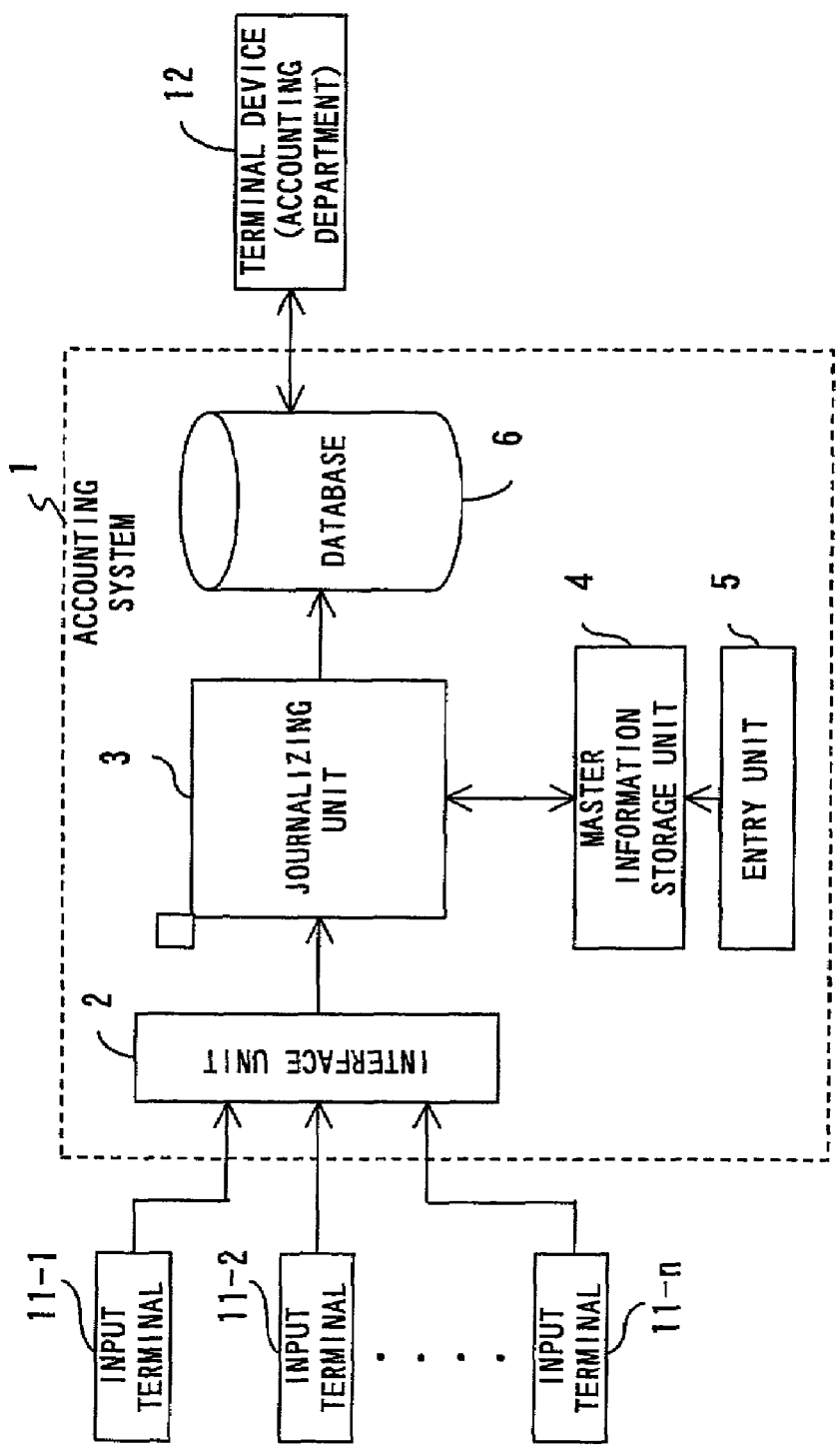
FIG. 1 shows the configuration of an embodiment of the accounting information processing system according to the present invention.

FIG. 1 shows the configuration of an embodiment of the accounting information process system according to the present invention. The system according to the present embodiment is fundamentally designed to be used in a company containing a plurality of divisions. In this embodiment, a 'division' refers to a sales department, a planning department, a purchase department, a personnel department, affiliated firms, etc.

An accounting system 1 receives the transaction data input in each division forming part of a company, and journalizes the transaction data, thereby generating accounting information. A 'transaction' refers to every economic process relating the company activities, and contains not only 'sales' and 'purchase of material' but also 'payment of wages', 'adjustment of traveling expenses', etc. Furthermore, 'journalizing' refers to a process of classifying transactions to be processed according to predetermined rules. According to the present embodiment, the 'accounting system' can refer to the software for generating financial statements, etc., or can refer to a device for the software.

An interface unit 2 receives transaction data input from each division, and provides a 'inhouse transaction code' common to all divisions. The 'inhouse transaction code' is described later. The interface unit 2 can be provided in each of the input terminals 11-1 through 11-n. That is, the software for realizing the interface unit 2 can be installed in each of the input terminals 11-1 through 11-n.

When a journalizing unit 3 receives transaction data through the interface unit 2, it retrieves necessary information from a master information storage unit 4, and journalizes the transaction data using the retrieved information. The data obtained in the journalizing process is referred to as journal data. The journalizing unit 3 stores the generated accounting information (journal data) in a database 6.

The master information storage unit 4 stores information required for the process of journalizing input transaction data. The information stored in the master information storage unit 4 can be provided by a user through an entry unit 5.

The database 6 can be a storage device such as semiconductor memory, an optical disk, a magnetic disk, etc., and stores accounting information generated by the journalizing unit 3.

Each of the input terminals 11-1 through 11-n can be, for example, a personal computer, and can be basically provided for each division. Each of the input terminals 11-1 through 11-n is connected to the accounting system 1 through a LAN or Intranet, etc. To each of the input terminals 11-1 through 11-n, business management software is installed or the function of viewing a page provided by the accounting system 1 is assigned. A user (member of the company) of the input terminals 11-1 through 11-n can input transaction data using the installed business management software, or the executable business management software through the page provided by the accounting system 1.

A terminal device 12 is, for example, a personal computer, and can be provided in the accounting division. The terminal device 12 is also connected to the accounting system 1 through a LAN or Intranet, etc. The terminal device 12 can access the database 6 through which accounting information is extracted to prepare financial statements, etc.

Figure 2:
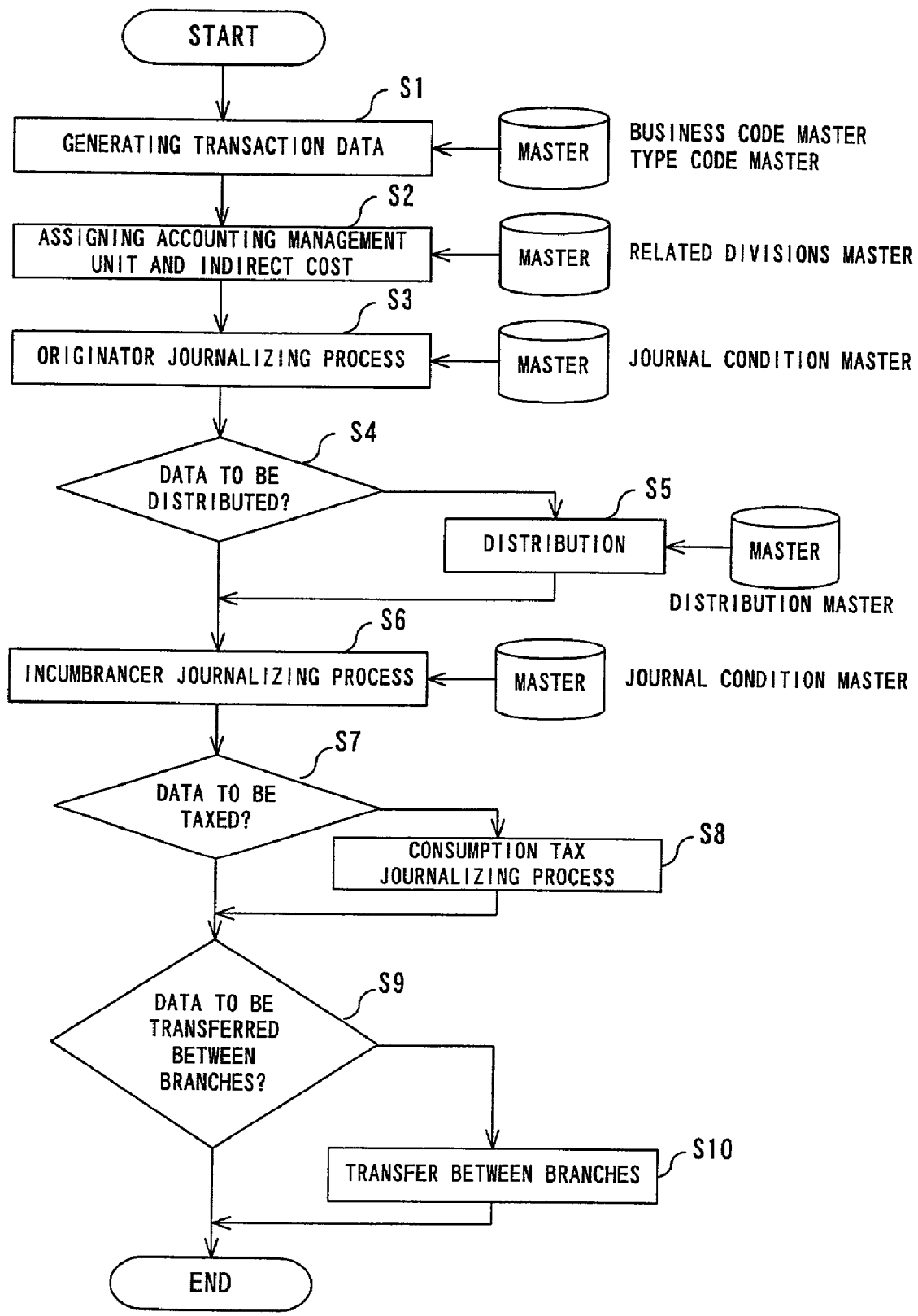
FIG. 2 is a flowchart showing the outline of the operations of the accounting system.

FIG. 2 is a flowchart of the outline of the operations of the accounting system according to the present embodiment. The processes according to the flowchart are performed by the accounting system 1 when the data input through the input terminals 11-1 through 11-n is received.

In step S1, the data available by the accounting system 1 is generated by assigning a 'business code' and a 'type code' to the transaction data received from the input terminals 11-1 through 11-n. This process is performed by the interface unit 2. The 'business code' and the 'type code' are identifiers commonly used for all divisions, and are used to classify the transaction data when financial statements are prepared in the accounting division. These codes are a part of the above described 'inhouse transaction codes', and are described later in detail. In the following descriptions, the transaction data assigned the 'business code' and the 'type code' may be referred to simply as 'transaction data'.

In steps S2 through S10, a journalizing process of classifying transaction data according to predetermined rules is performed by the journalizing unit 3. In this process, the accounting information to be stored in the database 6 is generated.

Since this accounting information can be obtained by classifying transaction data using the 'business code' and the 'type code', it is standardized in all divisions. Therefore, the accounting division can easily generate financial statements, etc. according to the accounting information. Each of the steps S2 through S10 is individually described below.

In step S2, an 'accounting unit' and an 'accounting management unit' corresponding to a 'division in charge of business' prescribed in the transaction data are obtained. In addition, an 'indirect cost section' corresponding to a 'division to be charged' is obtained. They are stored as journal data.

In step S3, an account title relating to a transaction originator is set. An 'originator' refers to a division involved in an actual transaction. An 'account title' refers to an item used when financial statements are generated, and can be referred to as a 'debit/credit account title'.

In an originator journal entry in step S3, a BD account (assets, capital, debt, etc.) is obtained based on the contents of transaction data. Practically, the master information storage unit 4 is accessed using the 'business code' and the 'type code' of the transaction data as keys to obtain the 'contents of business' and the 'type' (suspense payments, tangible fixed assets, etc.) in the BS account. Then, the obtained data is stored as journal data.

In step S4, it is checked whether or not the transaction data is to be distributed. In this embodiment, the 'distribution' refers to assigning the amount charged by the transaction to a plurality of sections. If the transaction data is to be distributed, control is passed to step S5. If the transaction data is not to be distributed, then step S5 is skipped, and control is passed to step S6.

Figure 3:
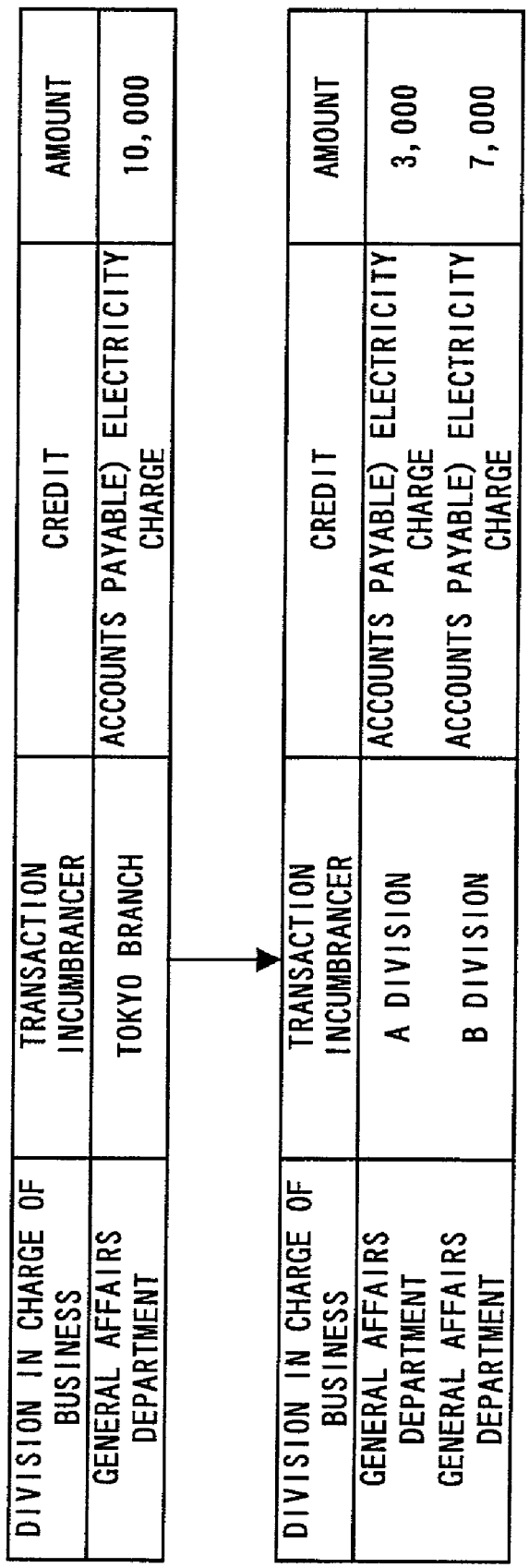
FIG. 3 shows an example of a distributing process.

In step S5, a distributing process is performed on the transaction data. In the distributing process, plural sets of transaction data are generated from one set of transaction data. An example is shown below by referring to FIG. 3. The example shown in FIG. 3 is the case in which the 'electricity expenses as an outstanding account to be borne by Tokyo Branch Office' is transferred to the two sections (sections A and B) in Tokyo Branch Office. The transfer of the amount is determined based on, for example, the ratio of the number of employees belonging to the sections A and B. The distribution pattern is preliminarily entered as distribution master information in the master information storage unit 4, and is referred to when the transaction data is to be distributed.

In step S6, an account title relating to a transaction incumbrancer is set. In this example, a incumbrancer' refers to a division to be charged with a PL account title (profits, expenses, etc.) originated by a transaction, or a division for actually processing the PK account title. In an incumbrancer journal entry, an account title (account title of the correspondent) corresponding to the account title obtained in the originator journal entry. For example, when the 'debit' is obtained in the originator journal entry in step S3, the 'credit' is obtained in the incumbrancer journal entry in step S6. In the incumbrancer journal entry, the master information storage unit 4 is accessed as in the originator journal entry, and the obtained information is stored as journal data.

In step S7, it is checked whether or not the transaction represented by transaction data is to be taxed. In this example, a 'tax' refers to, for example, a consumption tax. If a transaction is to be taxed, control is passed to step S8, and the amount relating to the consumption tax is determined. On the other hand, if the transaction is not to be taxed, then control skips step S8, and is passed to step S9. Transactions to be taxed are basically 'sales' and 'purchase'.

In step S9, it is determined whether or not transaction expenses, etc. represented by transaction data can be transferred to different branch offices. The determination is made based on whether or not the 'accounting unit' or the 'accounting management unit' of the transaction originator and the transaction incumbrancer obtained in step S2 matches each other. When an inter-branch transfer is required, transaction data for each accounting unit is generated in step S10. For example, when the accounting management unit relating to the manufacture division is different from the accounting management unit relating to the development division, and when the development division purchases and analyzes goods from another company at the request from the manufacture division, the expenses are borne by the manufacture division.

Thus, in the accounting system according to the present embodiment, the transaction data input by each division of a company is assigned a 'business code' and a 'type code' (step S1). These codes are identifiers commonly used by all divisions. Then, the accounting information containing necessary items to prepare financial statements can be generated using the above described codes (mainly in steps S3 and S6).

Figure 4:
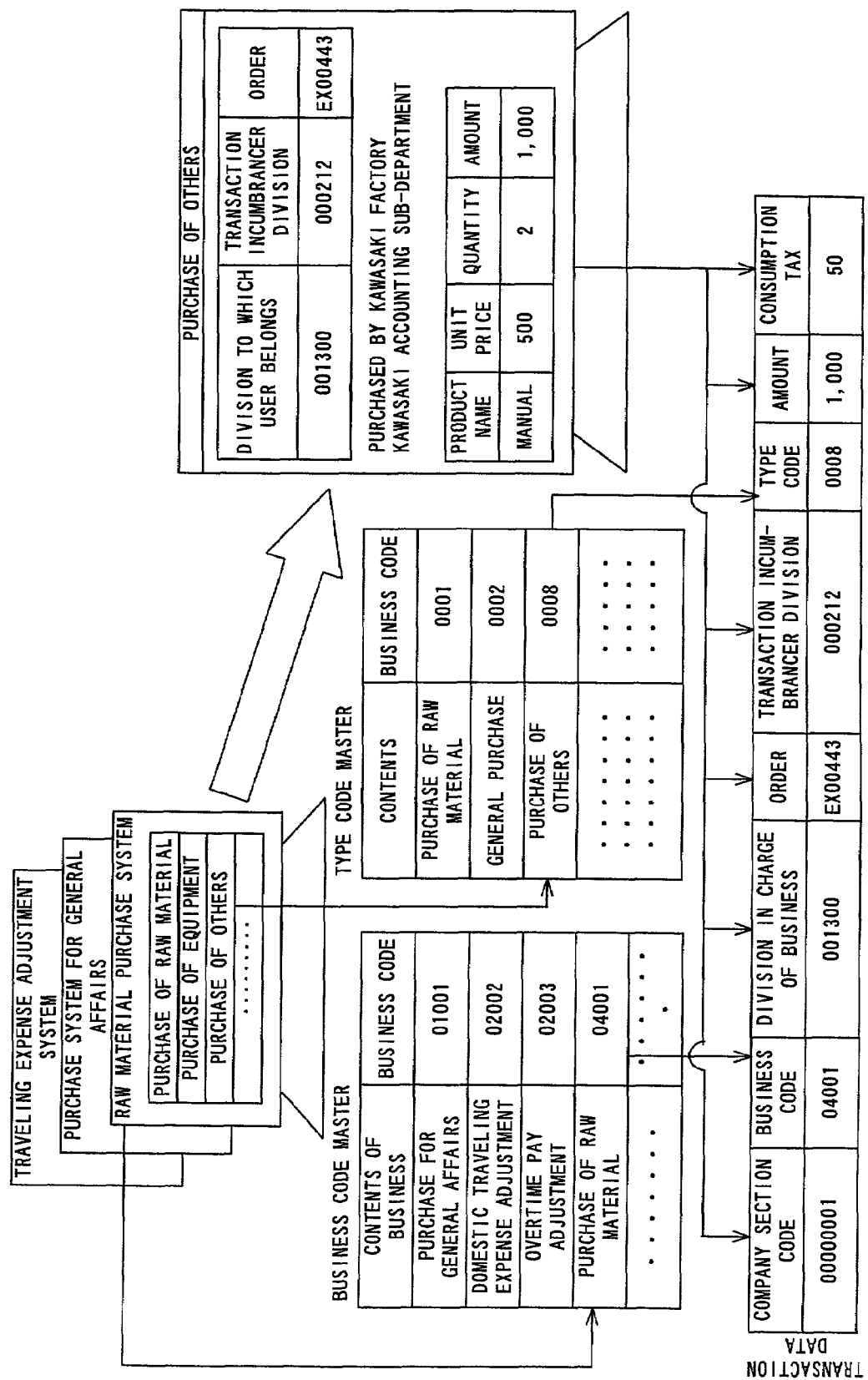
FIG. 4 shows the process of generating transaction data.

FIG. 4 shows the process of generating transaction data. In this example, a business management system is activated by the input terminal 11-1, and the user inputs the transaction data using a keyboard, a mouse, etc. The 'business management system' is a software program.

In the following example, the transaction data is generated when a transaction of 'the purchase division in Kawasaki Factory purchasing books' occurs, and the expenses of the transaction are borne by the accounting division of Kawasaki Factory.

The business management system includes a plurality of sub-systems such as a raw material purchase system, a general purchase system, a traveling expense adjustment system, etc. When the business management system is activated, a menu is displayed to allow a user to optionally select a subsystem. The user (in this example, an operator in the purchase division in Kawasaki Factory) selects any sub-system relating to the transaction associated with the operator's transaction from the displayed menu. In this example, the 'raw material purchase system' is selected.

Each sub-system displays a menu through which the user selects a transaction data input screen. In the example shown in FIG. 4, the 'raw material purchase system' comprises a 'transaction data input screen for purchase of raw material', a 'transaction data input screen for purchase of equipments', a 'transaction data input screen for purchase of others', etc.

The user selects a desired input screen from the displayed menu. In this example, the 'screen for purchase of others' is selected. The user inputs information relating to the transaction about a transaction in the displayed input format using a keyboard, etc. In this example, a 'division to which the user belongs', a 'division of a transaction incumbrancer', an 'order', a 'product name', a 'unit price', a 'quantity', and an 'amount' are input. The 'division to which the user belongs' indicates the division to which the user belongs, and actually indicates the division practically involved in a transaction. In addition, the 'division of a transaction incumbrancer' indicates a division for bearing the expenses, etc. of the transaction. Furthermore, the 'order' is an identifier classifying a transaction, and indicates an expense item. It is basically assumed that the operator of a division other than the accounting division inputs the 'order'. Therefore, the classifying method is not based on an account title, but on an expense item normally familiar to many users (for example, wages, traveling expenses, communications expenses, etc.).

Transaction data is generated according to the information input by the user. A 'company section code' identifies the company to which the division involved in the actual transaction belongs, and is automatically assigned based on the machine ID of the input terminal 11-1. This code is used, for example, when the expenses, etc. of a transaction to be processed are borne by another company, or when the expenses, etc. of another company is to be borne by the company of the user. An 'order', a 'division of a transaction incumbrancer' and an 'amount' are provided with the data input from the use.

The transaction data is assigned a 'business code' and a 'type code' as described above. The process of assigning these codes is performed by the interface unit 2 shown in FIG. 1.

A 'business code' is an identifier identifying the routine business activities of a company. This code can be obtained by classifying various business activities such that they can be convenient data in generating financial statements, etc., and assigning an identification number to each of the activities. FIG. 5 shows a part of an example of the 'business code'. The correspondence is entered as a business code master in the master information storage unit 4.

A 'type code' is an identifier identifying a cost element. This code can be obtained by classifying various elements according to account items, and assigning an identification number to each of the elements. FIG. 6 shows a part of an example of 'type code'. The correspondence is entered as a type code master in the master information storage unit 4.

The interface unit 2 determines a 'business code' and a 'type code' according to the operation procedure of the business management system in the input terminal 11-1. The menu of the business management system operated in the input terminal 11-1 is associated with the business code master and the type code master entered in the master information storage unit 4. Accordingly, when the user selects a subsystem in the business management system, the interface unit 2 automatically extracts the 'business code' corresponding to the selected sub-system from the business code master. In the example shown in FIG. 4, since the user selects the 'raw material purchase system', the interface unit 2 extracts the 'type code=04001'. When the user selects the screen on which transaction data is input, the interface unit 2 automatically extracts the 'type code' corresponding to the selected input screen from the type code master. In the example shown in FIG. 4, the user selects the 'purchasing others', and the interface unit 2 extracts the 'type code=0008'.

When the interface unit 2 is not installed in the input terminal 11-1, for example, the information about the user selecting operation is transferred from the input terminal 11-1 to the device on which the interface unit 2 is installed, and the 'business code' and the 'type code' are determined in the device.

The process of generating the accounting information from the transaction data generated as described above is explained below. The process of generating accounting information from transaction data is performed by the journalizing unit 3 shown in FIG. 1.

Figure 7:
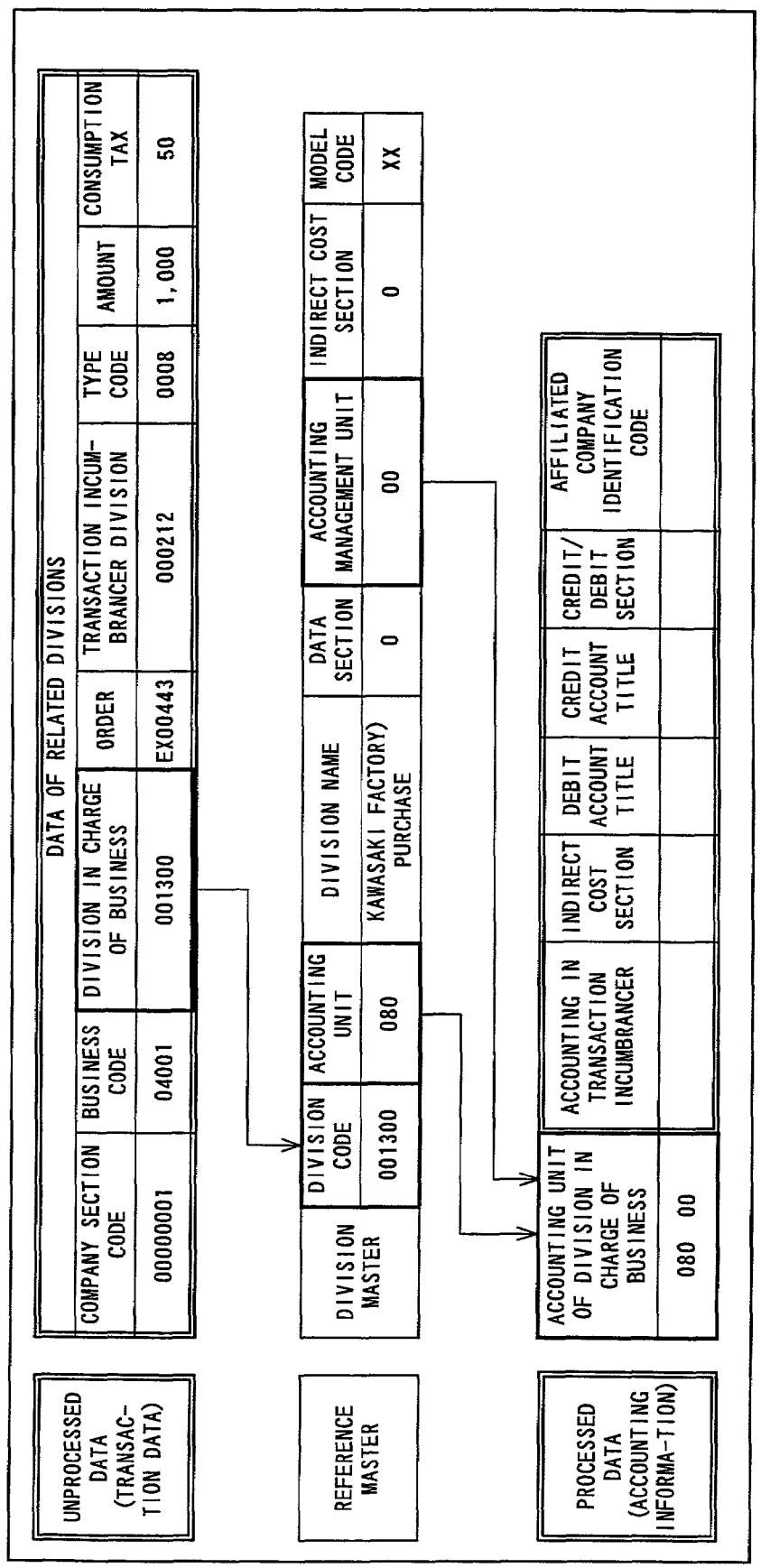
FIG. 7 shows an example (1) of the process of generating accounting information from transaction data.

When the journalizing unit 3 receives transaction data, it first extracts a 'division in charge of business' from the transaction data as shown in FIG. 7, and accesses the division master stored in the master information storage unit 4 as a key.

The division master stores the information about the accounting process for each division using the 'division code' identifying each division forming part of a company as a key as shown in FIG. 8. An 'accounting unit' is an identifier identifying an accounting sub-section to which the current division belongs when there are a plurality of accounting subsections in a company adopting a self-supporting accounting system for each branch. In addition, a 'accounting management unit' is an additional information of the 'accounting unit'.

A 'division name' is the name of a division corresponding to a 'division code'. An 'indirect cost section' is an identifier identifying each of the classified items obtained by dividing and classifying an indirect cost. A 'data section' and a 'model code' are not directly associated with the present invention, and the detailed descriptions are omitted here.

The journalizing unit 3 accesses the division master with the above described configuration using the 'division in charge of business' of the transaction data as a key, extracts the 'accounting unit' and the 'accounting management unit', and stores them as the 'accounting unit of division in charge of business' in the accounting information.

Figure 9:
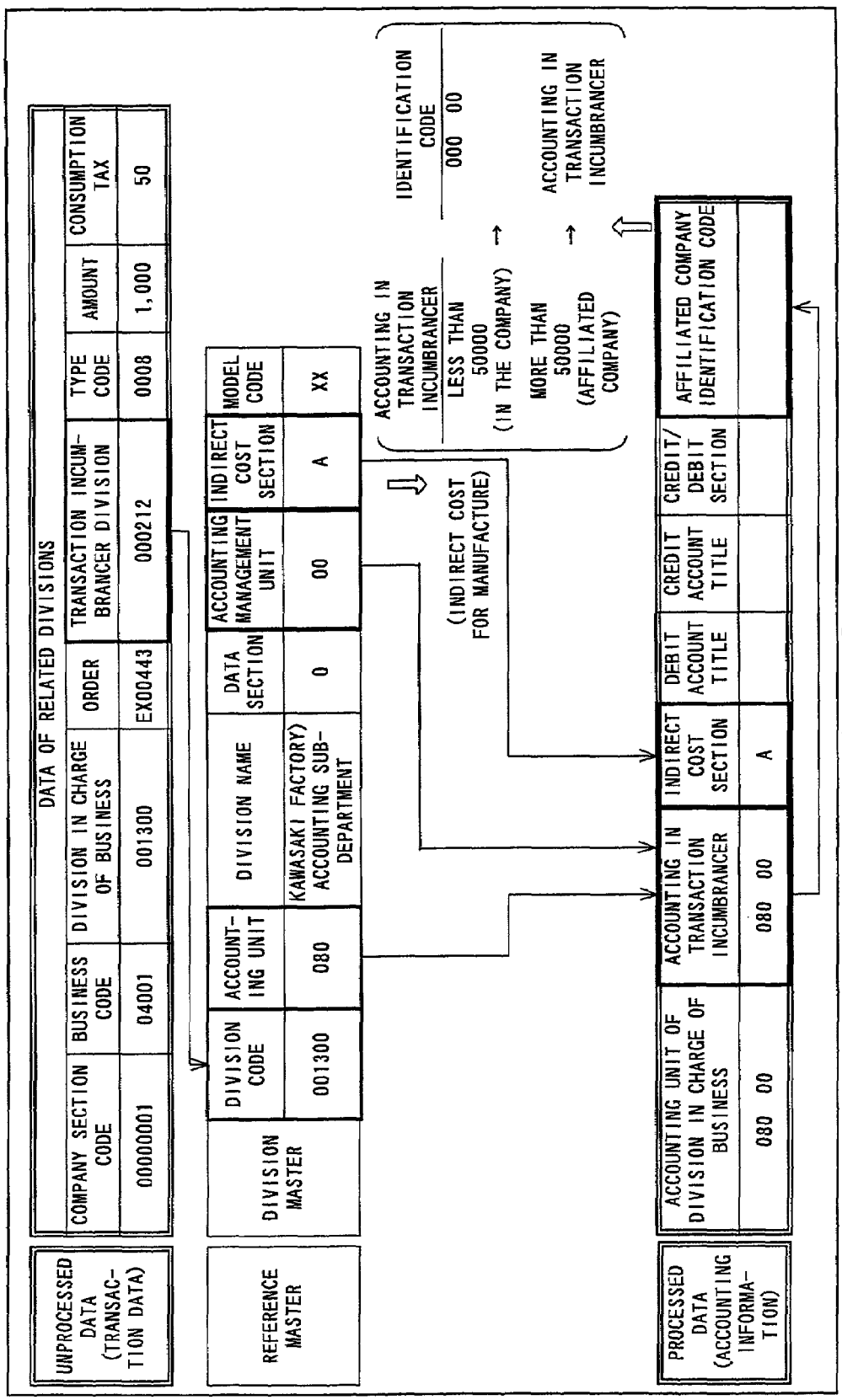
FIG. 9 shows an example (2) of the process of generating accounting information from transaction data.

Then, the journalizing unit 3 extracts a 'division of transaction incumbrancer' from transaction data as shown in FIG. 9, and accesses the above described division master using the value as a key. Then, the journalizing unit 3 extracts the 'accounting unit', the 'accounting management unit', and the 'indirect cost section' through the access, and stores them as the 'accounting unit of transaction incumbrancer' and the 'indirect cost section' of the accounting information. Furthermore, the journalizing unit 3 generates an 'affiliated company identification code' based on the 'accounting unit of transaction incumbrancer'. The correspondence between the 'accounting unit of transaction incumbrancer' and the 'affiliated company identification code' is determined when the division master is generated. In this example, the 'accounting unit of transaction incumbrancer<50000' indicates 'inhouse', and the 'accounting unit of transaction incumbrancer≧50000' indicates 'not inhouse (affiliated company)'.

The processes shown in FIGS. 7 and 9 correspond to the process in step 2 of the flowchart shown in FIG. 2. Therefore, the journalizing unit 3 then performs the transaction originator journalizing process in step S3.

Figure 10:
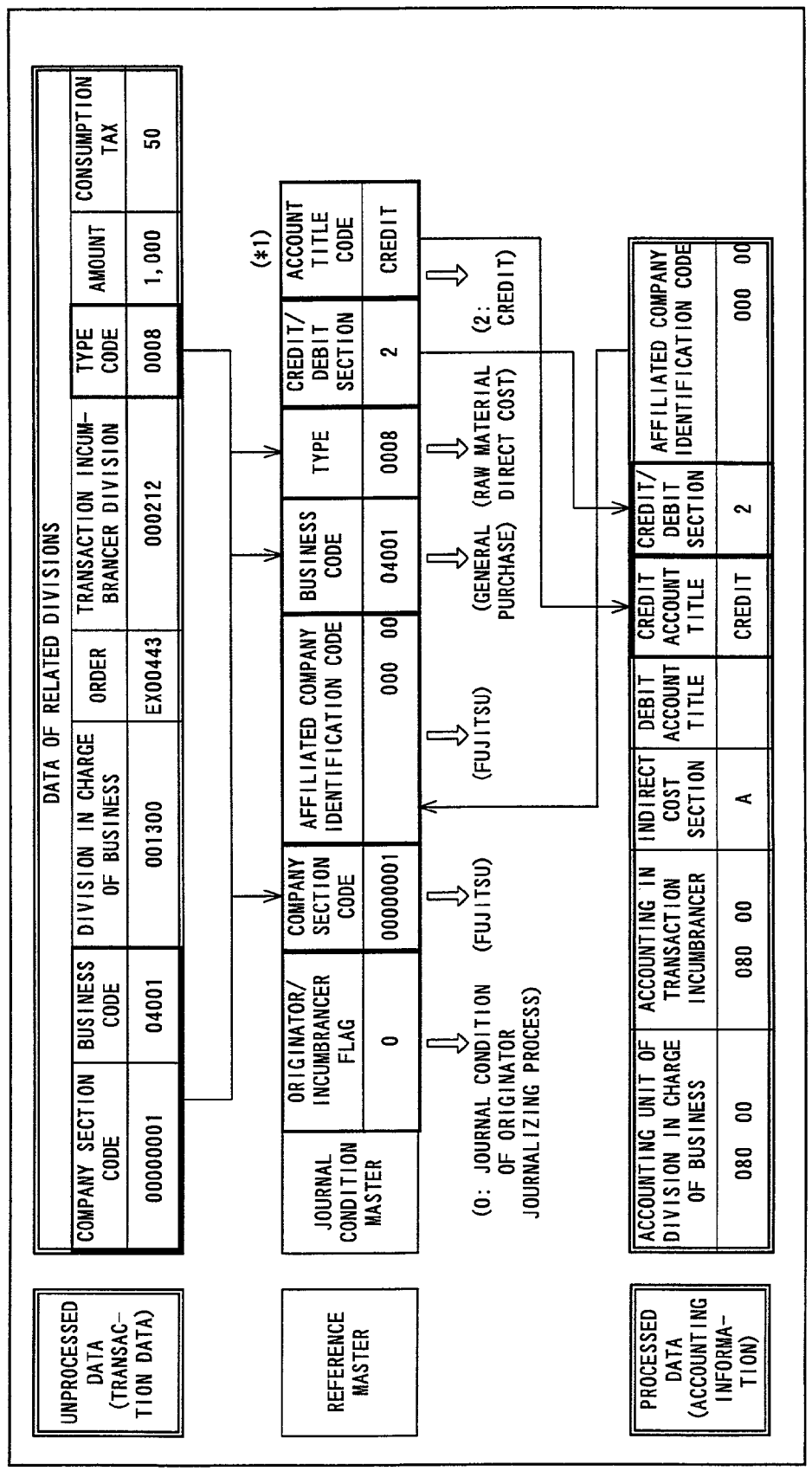
FIG. 10 shows an example (3) of the process of generating accounting information from transaction data.

In the transaction originator journalizing process, the journalizing unit 3 first extracts the 'company section code', the 'business code', and the 'type code' from transaction data as shown in FIG. 10, and accesses the journal condition master stored in the master information storage unit 4 using the extracted values as keys.

The journal condition master stores the information required to journalize transaction data using the 'company section code', the 'business code', and the 'type code' using the 'company section code', the 'business code', and the 'type code' as keys. The journal condition master is entered by the developer of this accounting system, or entered by the user through the entry unit 5.

An 'originator/incumbrancer flag' indicates in which process the current record is used, the originator journalizing process or the incumbrancer journalizing process. The 'affiliated company identification code' identifies an affiliated company involved in the transaction. An 'initial symbol' and an 'expense item code' are a part of an 'order code', and correspond to an 'order' input by the user through the business management system. The 'expense item code' identifies an expense item of a transaction. In addition, the 'initial symbol' is an identifier for classifying a plurality of 'expense item codes'. One or more 'expense item codes' belong to each 'initial symbol'. FIG. 12 shows examples of the 'initial symbol' and the 'expense item code'.

The 'indirect cost section' is an identifier for identifying each of the classified items when expense items are divided and classified. A 'credit/debit section' indicates whether the transaction of the current record is processed as 'credit' or 'debit'. An 'account title code' is described as the name of a title for simple explanation in FIGS. 10 and 11. However, it is actually a code formed by numerics, etc. The 'credit/debit section' and the 'account title code' are predetermined for each transaction according to various rules.

Back in FIG. 10, the journalizing unit 3 specifies a corresponding record by accessing a journal condition master using the 'company section code', the 'business code', and the 'type code' extracted from the transaction data as keys. Furthermore, the journalizing unit 3 extracts from the specified records a record in which the 'originator/incumbrancer flag' is set to 0 in the originator journalizing process. Then, the journalizing unit 3 retrieves the 'credit/debit section' and the 'account title code'. If the 'credit/debit section=1', then the retrieved 'account title code' is stored as a 'debit account title' of the accounting information. If the 'credit/debit section=2', then it is stored as a 'credit account title'. In the example shown in FIG. 10, since the 'credit/debit section=2', the retrieved 'account title code' is stored as the 'credit account title' of the accounting information. Furthermore, the value of the 'credit/debit section' retrieved from the record is stored as is as the 'credit/debit section' of the accounting information.

If a transaction to be processed involves a company and its affiliated company, then the 'affiliated company identification code' is used as a key when the corresponding record is extracted from the journal condition master. In this case, the journalizing unit 3 accesses the journal condition master using as a key the 'affiliated company identification code' extracted in the process shown in FIG. 9 and stored as accounting information.

After the originator journalizing process, a distributing process is performed as shown in the flowchart in FIG. 2. However, since the distributing process is an optional process, and the features of the present invention do not directly relate to the process, the detailed explanation is omitted here.

Figure 11:
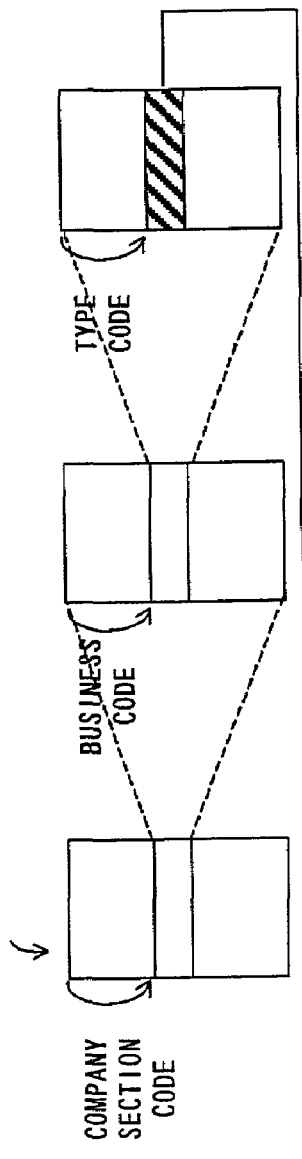
FIG. 11 shows the configuration of a journalizing condition master.
Figure 13:
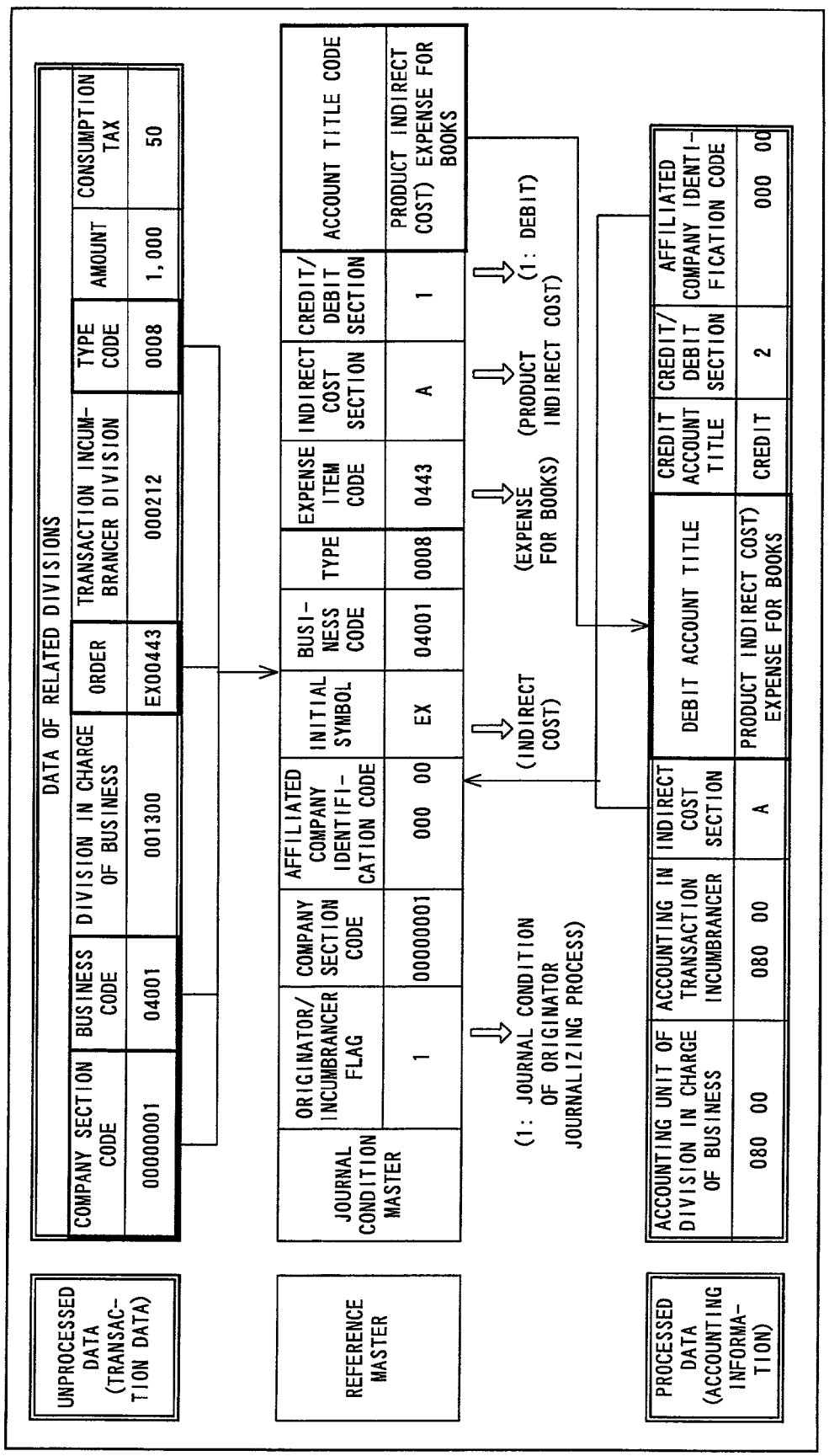
FIG. 13 shows an example (4) of the process of generating accounting information from transaction data.

Next, the journalizing unit 3 performs the incumbrancer journalizing process in step S6 in the flowchart shown in FIG. 2. In the incumbrancer journalizing process, when the journalizing unit 3 first extracts the 'company section code', the 'business code', the 'type code', and the 'order' from the transaction data as shown in FIG. 13, the corresponding record can be specified by accessing the journal condition master using the 'company section code', the 'business code', and the 'type code' as keys as shown in FIG. 11. In addition, the journalizing unit 3 extracts from the specified records one or more records in which the 'originator/incumbrancer flag' is set to 1. Furthermore, the journalizing unit 3 accesses the extracted records using the values of the first and second digits of the 'order' as an 'initial symbol', and the values of the third through the seventh digits of the 'order' ad the 'expense item code' so that the corresponding record can be selected.

Then, the journalizing unit 3 retrieves the 'credit/debit section' and the 'account title code' from the selected code. At this time, since the 'credit/debit section=1', the retrieved 'account title code' is stored as the 'debit account title' of the accounting information.

As in the originator journalizing process, the journalizing unit 3 can access the journal condition master using as a key the 'affiliated company identification code' previously extracted and stored in the incumbrancer journalizing process.

Then, as shown in the flowchart in FIG. 2, the taxing process (step S8) and the inter-branch transferring process (step S10) are performed. However, these processes do not directly relate to the features of the present invention, the detailed explanation is omitted here.

Thus, when the journalizing unit 3 receives the transaction data assigned the 'business code' and the 'type code', it generates accounting information using the codes. The accounting information contains the credit account title or the debit account title of a 'transaction' represented by transaction data. In the financial statements, transactions are classified and represented based on the credit account title or the debit account title. That is, the transaction data is automatically journalized to be displayed on financial statements, etc. on the premises.

In the example shown in FIG. 13, although the generated accounting information does not contain the 'amount' or the 'date', the information can also be contained.

The accounting information generated in the above described process is stored in the database 6 shown in FIG. 1. The database 6 can be accessed by at least the terminal device 12 (terminal device of the accounting division).

The accounting division retrieves the accounting information from the database 6, and generates financial statements. FIG. 14 shows an example of an auxiliary ledger generated according to the accounting information generated by the accounting system 1. In addition, FIG. 15 shows an example of a profit and loss table generated based on the auxiliary ledger. Thus, in the financial statements such as a profit and loss table, the costs, etc. relating to the transaction are classified into the 'debit account title' and the 'credit account title' unfamiliar to the division other than the accounting division. At this time, in the accounting information generated by the accounting system 1, the 'debit account title' or the 'credit account title' is set for each transaction. In addition, since the 'credit/debit section' indicating 'debit' or 'credit' is also set, the financial statements can be easily prepared.

The following effects can be obtained by installing the accounting system according to the present embodiment.

(1) Since the accounting system automatically journalizes transaction data, the load on the accounting division can be reduced. In addition, if the accounting system is provided with the function of detecting an input error, the accounting division does not receive uncertain or inappropriate data in generating financial statements, thereby reducing the load. Detecting an input error refers to the function of checking whether or not the 'business code', the 'type code', the 'order', the 'division in charge of business', and the 'transaction incumbrancer division' are set. When the accounting system detects an error, it prompts each division to input correct data by outputting a message to an input terminal which input the transaction data. With the configuration, the responsibility relating to the input of the accounting information is distributed from the accounting division to each of the divisions other than the accounting division. Therefore, various improving activities can be supported.

(2) Since an identifier commonly used by all divisions is adopted when transaction data is journalized, the accounting division can centrally manage each of other divisions. For example, if the function of rejecting the input of transaction data assigned the 'business code' or the 'type code' is provided corresponding to a specific account title, then the cost of a specific account title on the financial statements can be adjusted (specifically deleted). In this case, the operator of each division who inputs transaction data is not required to understand the meaning of the account title.

(3) In the transaction data input in each division, the 'division in charge of business' and the 'division of transaction incumbrancer' are set. Therefore, the accounting system can transmit transaction data to the correspondent division without any operation by the accounting division. In the journalizing process in the accounting system, an identifier commonly used by all divisions is adopted. Therefore, the division of a transaction incumbrancer can easily recognize the contents of the transaction data transmitted from the division in charge of business. Conventionally, when the division in charge of business inputs the transaction data, the contents of the data are transmitted to the division of the transaction incumbrancer through the accounting division, thereby requiring a laborious process.

(4) Since the 'business code' and the 'type code', which are important identifiers in classifying transactions to be processed in financial statements, are automatically assigned by the accounting system, an input error by the user can be avoided.

(5) When a new type of business is to be processed, a code corresponding to the new business is defined and entered in the master information storage unit 4, and the input interface of the business management system provided in each division is rewritten so that the transaction data relating to the new business can be journalized.

Figure 16:
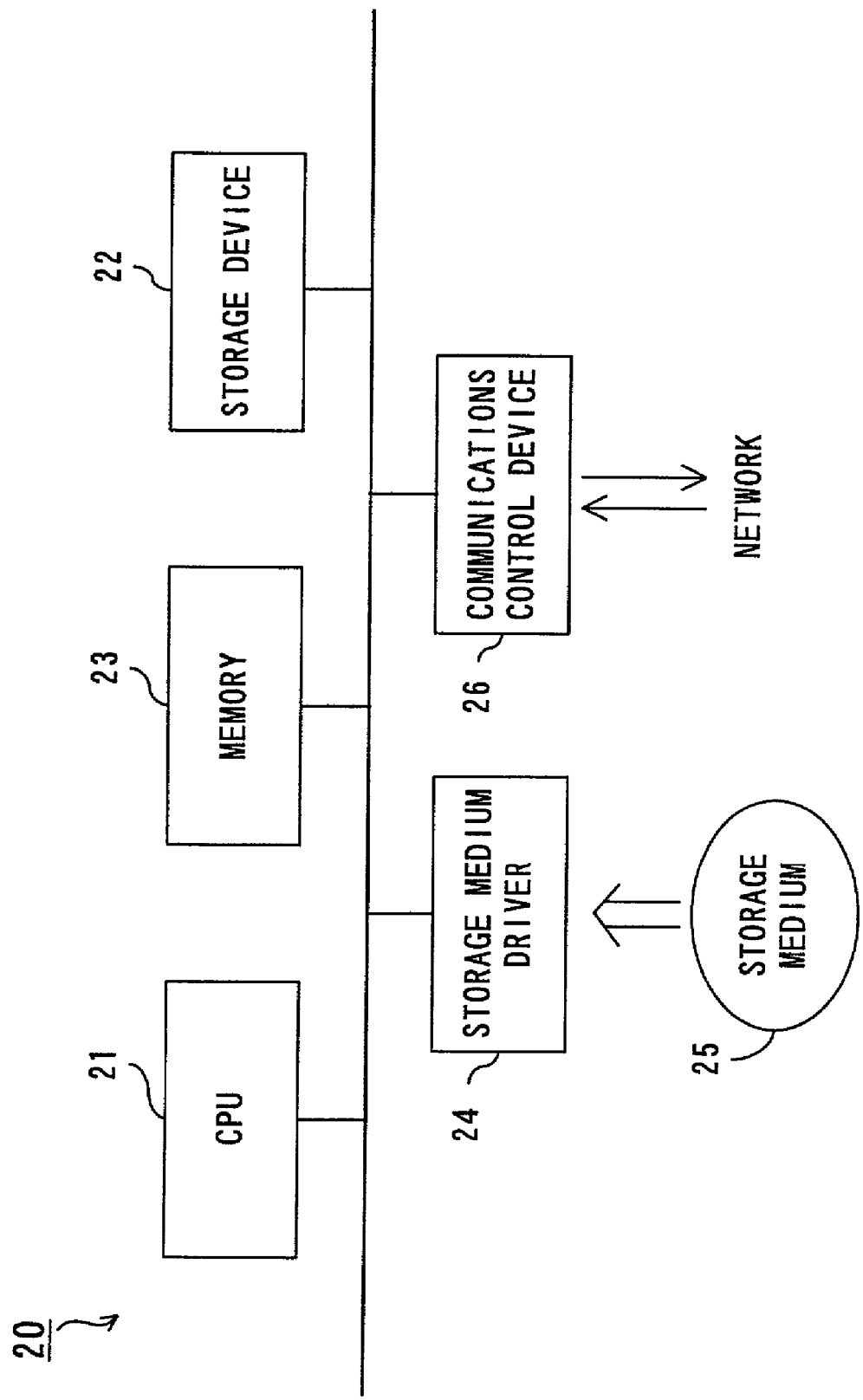
FIG. 16 is a block diagram of a computer used to realize the accounting system according to an embodiment of the present invention.

The accounting system of the above described embodiment can be realized by performing a program describing the process shown in the flowchart in FIG. 2. FIG. 16 is a block diagram of a computer 20 for executing the program.

A CPU 21 executes the program describing the process shown in the flowchart in FIG. 2 after loading it from a storage device 22 to memory 23. The storage device 22 can be, for example, a hard disk, stores the program and various master information, and stores accounting information obtained as a journal result. That is, the storage device 22 functions as the master information storage unit 4 and the database 6. On the other hand, the memory 23 can be, for example, semiconductor memory, and can be used as a work area of the CPU 21.

A storage medium driver 24 accesses a portable storage medium 25 at an instruction of the CPU 21. The portable storage medium 25 contains a semiconductor device (IC card, etc.), a medium (a floppy disk, a magnetic tape, etc.) storing information by a magnetic effect, and a medium (an optical disk, etc.) storing information by an optical effect. A communications control device 26 receives and transmits data through a network at an instruction of the CPU 21.

Figure 17:
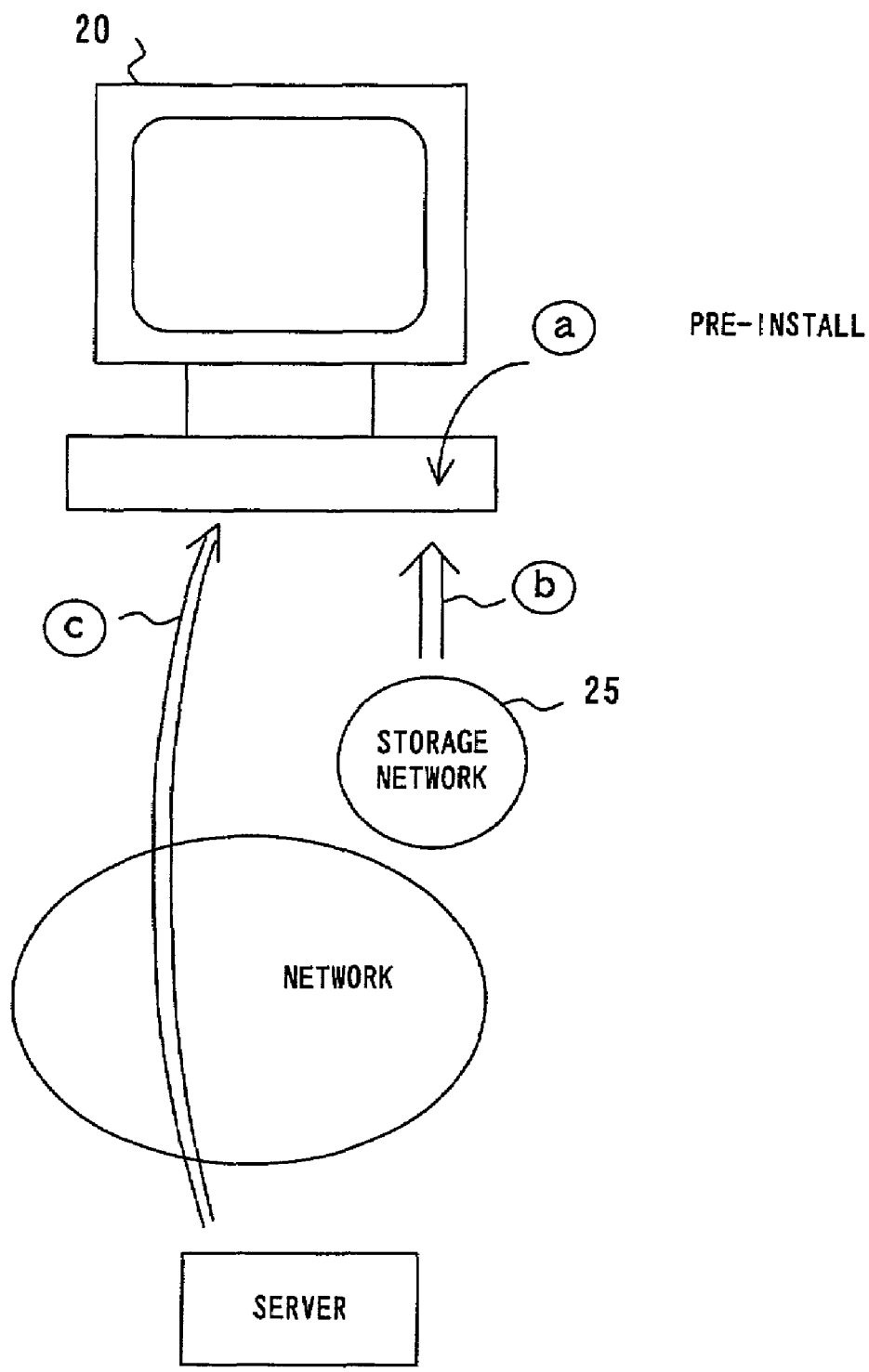
FIG. 17 shows the method of providing a program according to the present invention.

FIG. 17 shows the method of providing a program according to the present invention. The program according to the present invention is provided by an optional method of the following three methods.

(a) Provided after being installed in the computer 20. In this case, the program is preinstalled before delivery.

(b) Provided after being stored in a portable storage medium. In this case, the program, etc. stored in the portable storage medium 25 is basically installed in the memory 23 through the storage medium driver 24.

(c) Provided by a server through a network. In this case, the computer 20 basically downloads the program, etc. stored by the server to obtain the program.

According to the present invention, a convenient identifier can be automatically assigned to the transaction data indicating a transaction to be processed when financial statements are prepared. Therefore, the information about the financial condition and the profit and loss of a company can be easily generated based on the transaction to be processed.

Since the identifier assigned to transaction data is commonly used for all divisions of a company, the accounting division can centrally manage the information about the activities of the company.

What is claimed is:

1. An apparatus for processing accounting transaction data representing transactions of a company having a plurality of divisions, the accounting transaction data including information that represents an amount for a corresponding transaction, the apparatus comprising:

an interface unit receiving a set of transaction data from each of the divisions, a data format of the transaction data being different for each division;

a storage unit to store first identifiers and second identifiers, each of the first identifiers identifying a business activity of the company and being commonly used for the plurality of the divisions, and each of the second identifiers identifying an account title categorized according to cost elements; and a journalizing unit to extract, for each set of transaction data, one of the first identifiers from the storage unit based on each set of transaction data and the division from which each set of transaction data are received, to extract a corresponding one of the second identifiers from the storage unit based on the extracted first identifier, and to classify each set of transaction data according to the first identifier and the second identifier, wherein each set of transaction data is assigned a third identifier identifying a first division that performs a particular transaction, and a fourth identifier identifying a second division that bears an expense of the particular transaction, the journalizing unit generates first transaction data of each set of transaction data including information representing an amount to be allocated to a first subdivision and second transaction data of each set of transaction data including information representing an amount to be allocated to a second subdivision when the second division has the first and second subdivisions, the journalizing unit programmed to determine a ratio of the amount to be allocated to the first and second subdivisions based on a number of members belonging to the first and second subdivisions, the journalizing unit programmed to classify the transaction data including the first and second transaction data according to the first identifier, the second identifier, the third identifier, and the fourth identifier, and the third identifier is generated based on a machine ID of a machine to which the transaction data are input, and the fourth identifier is generated based on user input.

* * * * *

UNITED STATES PATENT AND TRADEMARK OFFICE
CERTIFICATE OF CORRECTION

PATENT NO. : 7,254,554 B2  Page 1 of 1
APPLICATION NO. : 09/499729
DATED : August 7, 2007
INVENTOR(S) : Kazuo Tawara et al.

It is certified that error appears in the above-identified patent and that said Letters Patent is hereby corrected as shown below:

Title Page, item [56]: Column 2 (U.S. Patent Documents), Line 2, change "364/419.19" to --705/30--.

Signed and Sealed this

Fourth Day of December, 2007

JON W. DUDAS
*Director of the United States Patent and Trademark Office*